(No Model.)
D. PETTIT.
BALL BEARING FOR VEHICLES.
No. 517,235. Patented Mar. 27, 1894.
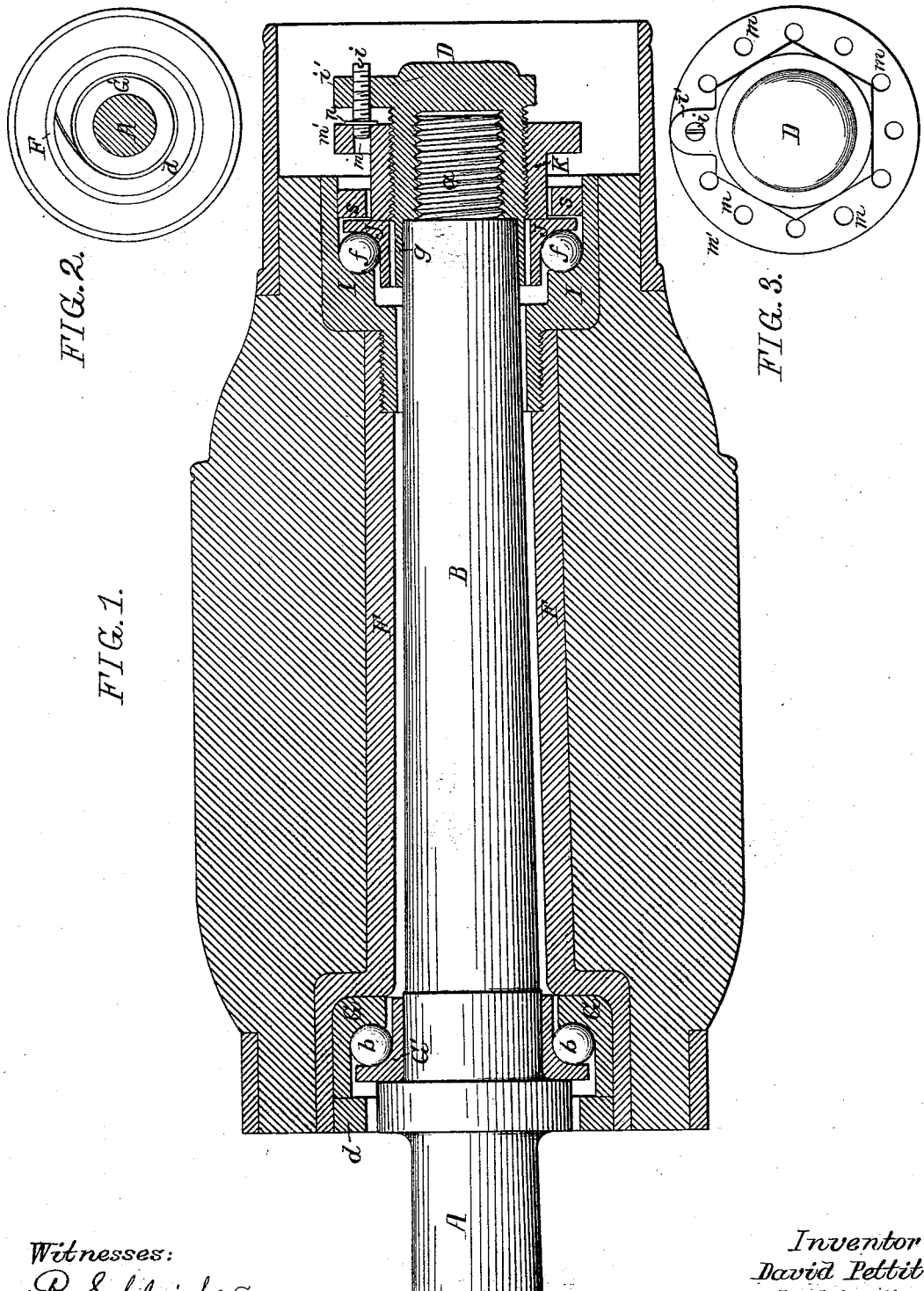
Witnesses:
R. Schleicher
Frank Bechtold
Inventor:
David Pettit
by his Attorneys
Howson & Hinson

UNITED STATES PATENT OFFICE.

DAVID PETTIT, OF BEVERLY, NEW JERSEY.

BALL-BEARING FOR VEHICLES.

SPECIFICATION forming part of Letters Patent No. 517,235, dated March 27, 1894.

Application filed September 26, 1893. Serial No. 486,533. (No model.)

*To all whom it may concern:*

Be it known that I, DAVID PETTIT, a citizen of the United States, and a resident of Beverly, Burlington county, New Jersey, have invented certain Improvements in Ball-Bearings for Vehicles, of which the following is a specification.

The object of my invention is to so construct a ball bearing for vehicles as to permit of the ready application of the same to the axles at present in use and to utilize the ordinary hub box as part of the improved bearing. This object I attain in the manner hereinafter set forth, reference being had to the accompanying drawings, in which—

Figure 1, is a longitudinal section, partly in elevation, of an axle and wheel hub having a ball bearing constructed in accordance with my invention. Fig. 2, is a view on a smaller scale of the rear end of the box, and Fig. 3, is an end view of the adjusting device at the front end of the box.

A represents part of an ordinary vehicle axle and B the usual tapered journal of the same, this journal being reduced and threaded at the outer end as shown at $a$ for the reception of the nut D. The usual box F of the hub is reduced in length so that it can be moved outward on the journal in order to clear the same and to the inner end of this box F is secured a ring G recessed to form a bearing for a series of balls $b$, which also have a bearing upon a sleeve G', which fits over the base of the journal B and abuts against a shoulder formed on the axle at the inner end of the journal. Beyond the inner end of the ring G is a detachable ring or collar $d$ preferably split and retained by friction in the inner end of the box F, this ring or collar serving to retain the sleeve G' in place when the box is removed from the journal, but being readily removable when it is desirable to remove said sleeve G'. The outer end of the box F is threaded for the reception of the reduced inner end of a ring I which is recessed to form a bearing for the outer set of balls $f$, the latter also having a bearing upon an adjusting cone J which is acted upon by a nut K adapted to an external thread cut upon the retaining nut D, the latter having an inwardly projecting flange $g$ which is tapered internally to accord with the taper of the journal B and bears tightly upon the outer end of said journal, the outer cylindrical face of said flange forming a bearing for the cone J, which can therefore be readily adjusted so as to take up any slack in the bearing, said cone being held in position after adjustment by locking the nut K by means of a set screw $i$ passing through a flange $i'$, on the nut D and engaging with one of a series of openings $m$ formed in a flange $m'$ of the said nut K. The set screw $i$ has near its inner end a flange or collar $n$ which serves to prevent the unscrewing of the set screw from the flange $i'$ of the nut D and thus prevents loss of said set screw.

In order to prevent the escape of the balls $f$ when the box is removed from the journal the inner bearing for said balls is slightly undercut and the cone J is held in place longitudinally by means of an expansion ring $s$ fitting in the outer end of the box which prevents such play of the cone J as would permit the balls to drop from the ring I.

Although I have shown expansion rings or collars $d$ and $s$ as a means of holding the bearings in place when the axle is removed, I lay no special claim to this construction, nor is my invention limited thereto.

It will be evident that each of the bearing rings and its cone can be constructed for the reception of more than one set of balls, if desired, without departing from my invention, and the adjusting cone J, may in some cases form part of the nut K.

Having thus described my invention, I claim and desire to secure by Letters Patent—

1. The combination of the journal having at the outer end a retaining nut with external threaded portion, the box having a ball bearing ring, the balls, the adjusting cone and a nut acting upon said cone and adapted to the externally threaded portion of the retaining nut, substantially as specified.

2. The combination of the axle and its journal having at the outer end a retaining nut with flange seated upon the outer end of the journal, the box having a ball bearing ring at its outer end, the balls, the adjusting cone seated upon the flange of the retaining nut, and a nut adapted to an external thread on the retaining nut and serving to adjust said cone, substantially as specified.

3. The combination of the axle and its journal, the outer ball bearing ring and its adjusting nut, the balls the retaining nut, and a set screw for locking the adjusting nut, said set screw being adapted to a threaded opening in the retaining nut and having a flange or collar for preventing its withdrawal, substantially as specified.

In testimony whereof I have signed my name to this specification in the presence of two subscribing witnesses.

DAVID PETTIT.

Witnesses:
FRANK E. BECHTOLD,
JOSEPH H. KLEIN.